Figure 1:
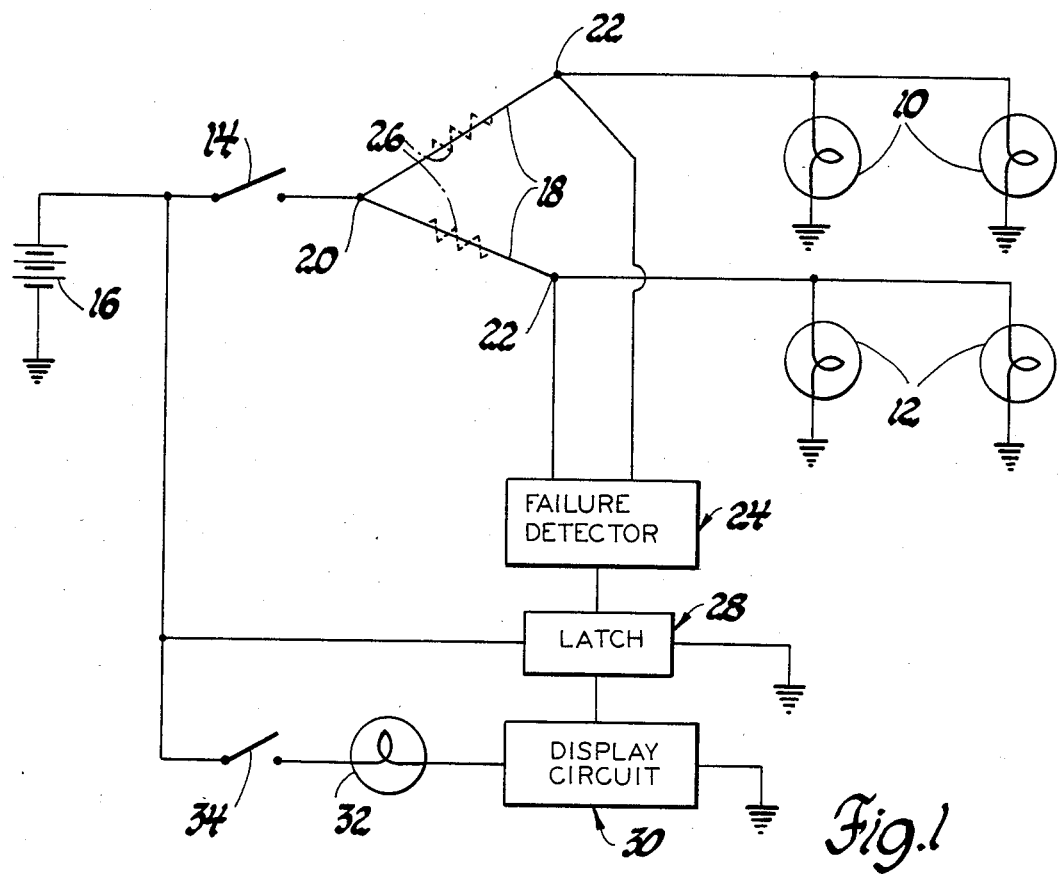

United States Patent [19]

Steele

[11] Patent Number: 4,550,303
[45] Date of Patent: Oct. 29, 1985

[54] LAMP MONITOR WITH LATCH CIRCUIT

[75] Inventor: Robert E. Steele, Cortland, Ohio

[73] Assignee: General Motors Corporation, Detroit, Mich.

[21] Appl. No.: 597,112

[22] Filed: Apr. 5, 1984

[51] Int. Cl.$^4$ .............................................. B60Q 1/26
[52] U.S. Cl. ........................................ 340/80; 340/79; 340/81 R; 340/52 D; 340/64; 340/641; 315/82
[58] Field of Search ............... 340/80, 81 R, 79, 520, 340/85, 635, 641, 642, 64; 315/77, 82, 83

[56] References Cited

U.S. PATENT DOCUMENTS

| | | | |
|---|---|---|---|
| 3,421,157 | 1/1969 | Atkins | 340/81 R |
| 3,593,264 | 7/1971 | Atkins | 340/81 R |
| 3,660,813 | 5/1972 | Rumpf | 340/52 R |
| 3,688,297 | 8/1972 | Barnum | 340/80 |
| 3,735,378 | 5/1973 | McNamee | 340/81 R |
| 3,956,733 | 5/1976 | Sakurai | 340/80 |
| 3,975,708 | 8/1976 | Lusk et al. | 340/81 R |
| 4,173,751 | 11/1979 | Bryant | 340/80 |

Primary Examiner—Donnie L. Crosland
Attorney, Agent, or Firm—Warren D. Hill

[57] ABSTRACT

A lamp monitor for detecting the failure of headlamps and other lamps on an automotive vehicle includes a failure detection circuit coupled to the lamp circuit to produce an output whenever the lamp circuit is operating and a failure occurs. A latch circuit responsive to the detector output and powered from the vehicle battery latches into a failure state when a lamp failure is detected and maintains that state even though the lamp circuit or the vehicle ignition circuit is switched off. The latch output triggers an indicator circuit to reveal an indication or warning when the vehicle ignition switch is turned on even though the lamp circuit is turned off and the ignition switch has been opened subsequent to the detected failure. Upon correction of the failure, the detector resets the latch circuit when the lamp circuit is actuated to disable the display.

2 Claims, 2 Drawing Figures

LAMP MONITOR WITH LATCH CIRCUIT

This invention relates to a vehicle lamp monitor circuit and particularly to such a circuit which latches on a failure detection signal until a correction of the failure has been made.

In earlier lamp failure detection systems, lamp failure detection circuits were able to detect a lamp failure while the lamp circuit was actuated and trigger a warning device or indicator which remained on until the lamp circuit was turned off. In some cases, a latch circuit was included to maintain the warning or failure indication after the lamp circuit has been turned off provided, however, that the vehicle ignition switch remained closed. In either case, when the ignition switch is turned off, the indication signal is lost so that the next time the vehicle is in use, the warning signal is not present unless the lamp circuit is again turned on and the failure is again detected. In the interim, there is no reminder to have the problem remedied. Thus, in the case of the vehicle headlamps which are usually not turned on during the daylight hours, a failure indication would not be displayed during the time of day when service or replacement parts are most likely to be available.

It is therefore an object of the invention to provide a lamp failure detector circuit which latches on when a lamp failure is detected and remains on to energize an indicator during any future vehicle operation until the fault has been corrected.

This invention is carried out by providing a lamp failure detection circuit connected to a lamp circuit for detecting a lamp failure while the circuit is in operation, a latch responsive to the failure detection and continuously empowered by the vehicle power supply to maintain a lamp failure state until a correction is made, and an indicator circuit responsive to the latch condition for providing a warning during those periods when the ignition switch is closed and the failure persists.

Figure 2:
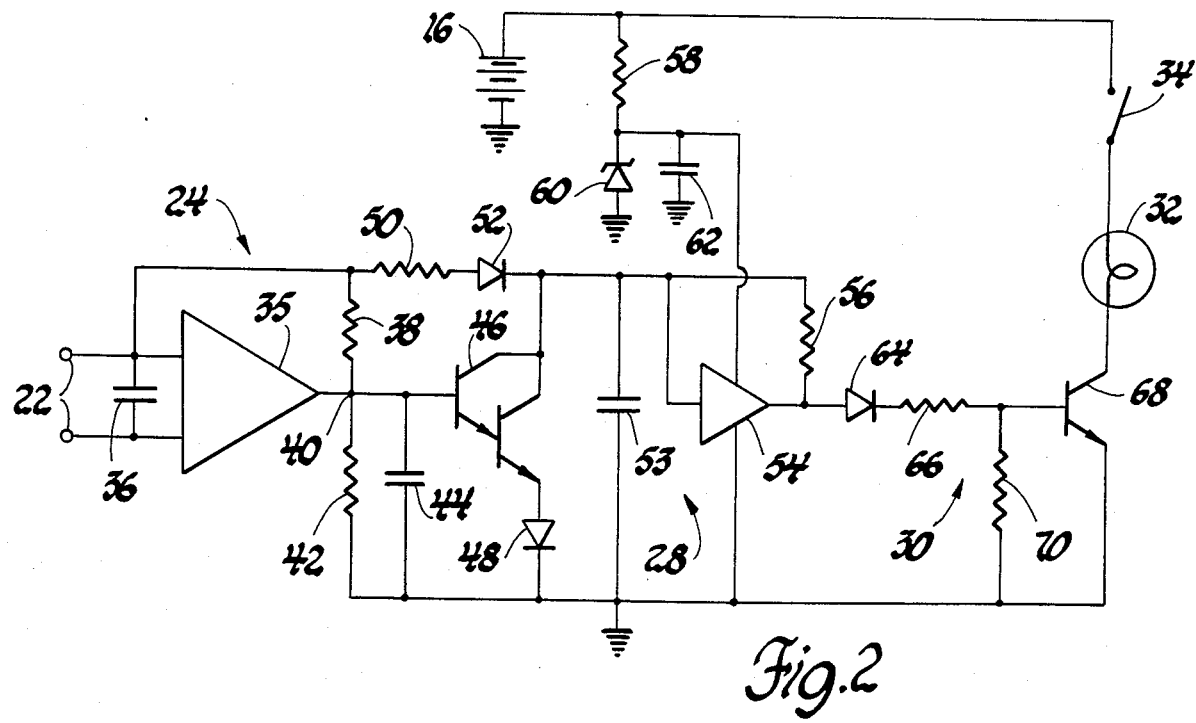

The above and other advantages of the invention will become more apparent from the following description taken in conjunction with the accompanying drawings wherein:

FIG. 1 is an electrical diagram partially in block form of a lamp failure detection circuit according to the invention coupled to a vehicle lamp circuit, and FIG. 2 is a schematic diagram of the failure detection circuit according to the invention.

Referring to FIG. 1, a lamp or lamp array 10 and a similar lamp or lamp array 12 are connected through similar wiring harnesses and a lamp switch 14 to a vehicle power supply in the form of a battery 16. The lamps or arrays 10 and 12 may be, for example, the high beam headlamps for the left and right sides of a vehicle, respectively, and draw equal amounts of current through their respective harness wires, assuming that each lamp is functioning correctly. When, however, a filament fails, the currents drawn in the two harness wires are no longer equal. Equal lengths of the harness wire 18 joined at one end to a common junction point 20 are each coupled at the other end 22 to the inputs of the failure detection circuit 24. The equal lengths of harness wires 18 each have a resistance indicated by dotted lines 26. The harness wires 18 have a gage and length calculated to give 0.02 volts drop per lamp 10 or 12.

The failure detection circuit 24 includes a comparator which senses the voltages at the harness points 22. When all lamps are properly functioning, the circuit is balanced so that there is no voltage offset at the input to the comparator. When a lamp filament burns out, however, an imbalance condition exists and the comparator outputs a signal to a latch 28 which is connected to the battery to maintain its state even though other vehicle circuits are switched off. The latch will retain the failure information until the imbalance condition is corrected and the lamp switch 14 is closed to reactivate the lamps and reset the failure detector 24 and the latch 28. The output signal of the latch 28 is connected to a display circuit 30 which is effective to drive a warning lamp 32, for example, which is coupled through the vehicle ignition switch 34 to the battery 16. The lamp 32 is typical of a warning device since the indication signal provided by the display circuit 30 may be used to activate an alarm or to feed a failure signal to a computer which in turn renders a failure indication.

Referring to FIG. 2, the failure detector 24 includes an input stage comprising a comparator 35 which is particularly useful for lamp failure detection and which is a modified version of the lamp failure indicating apparatus shown and described in the patent to McNamee, U.S. Pat. No. 3,735,378. The comparator 35 is based on a differential amplifier for comparing the voltage on the inputs 22 and which has an open collector Darlington output that sinks current when an offset condition is sensed on its inputs and is turned off when the inputs are balanced. A small capacitor 36 is connected across the inputs 22 of the comparator 35 to filter out noise which might give rise to false failure signals. One of the inputs is connected through a resistor 38 to the output terminal 40 of the comparator 35 which, in turn, is coupled through a resistor 42 to ground. A capacitor 44 is connected across the resistor 42. The output stage of the failure detector 24 comprises an inverter 46 in the form of a Darlington pair which has its base connected to the output 40 of the comparator and its emitter connected through a diode 48 to ground. The Darlington collector is coupled to the input 22 through a resistor 50 and a diode 52. The capacitor 44 filters out transients particularly those which may occur upon operation of lamp switch 14 to prevent false triggering of the Darlington 46.

The latch circuit 28 comprises a capacitor 53 between the collector of the Darlington 46 and ground, as well as a non-inverting buffer amplifier 54 having its input connected to the collector of the Darlington 46 and its output coupled through a feedback resistor 56 to its input. The non-inverting buffer 54 is continuously connected to a regulated power supply which comprises resistor 58 and a Zener diode 60 serially connected across the battery 16 with a capacitor 62 across the Zener diode. The cathode of the Zener diode 60 is the regulated voltage point that is connected to the non-inverting buffer 54. Current drain on battery 16 during the standby condition of the circuit is minimized by using a CMOS non-inverting buffer which has very low current requirements and yet maintains its state when the power is removed from the remainder of the circuit of FIG. 2. The latch output, which comprises the output of the non-inverting buffer 54, is connected through a diode 64 to the display circuit 30.

The input of the display 30 includes a resistor 66 coupled to the base of an NPN transistor 68 which has a grounded emitter and its base connected to ground through a resistor 70. The collector of the transistor 68 is coupled to the warning lamp 32 which is in series with the ignition switch 34. Other lamp monitors making use of the same display circuit 30 can be coupled to the circuit just described at the cathode of the diode 64, the regulated voltage supply also being used in common by the other lamp monitor circuits.

In operation, when the lamp switch 14 is closed and the lamps are activated, if no malfunction exists the comparator 35 is turned off and high potential is applied to the output 40 through the resistor 38. That voltage at the output 40 causes the Darlington 46 to be turned on so that the capacitor 53 is discharged and the input to the non-inverting buffer 54 and its output are held at a low voltage. Consequently, the transistor 68 is nonconductive and there is no failure warning emitted by the lamp 32. If the switch 14 is then opened, there will be no voltage applied to the resistor 38 and the Darlington 46 will be off. Since the non-inverting buffer 54 is continuously actuated, the low output thereof is fed through the resistor 56 to the input thereof to hold the input low.

If, on the other hand, the lamp switch 14 is closed and a malfunction occurs causing a voltage imbalance at the inputs of the comparator 35, the output 40 of the comparator goes low to turn off the Darlington 46 while current applied through the resistor 50 and the diode 52 charges the capacitor 53 and applies a high input signal to the non-inverting buffer 54 which, therefore, produces a high output signal which turns on the transistor 68 and the lamp 32, provided that the ignition switch 34 is closed. If the lamp switch 14 is opened to turn off the lamps with the malfunction still present, there will be no voltage at the output 40 of the comparator 35 because there is no voltage applied to the resistor 38. The capacitor 53 remains charged since the continuously operating buffer 54 maintains the input thereof as well as the capacitor 53 at a high voltage through the feedback resistor 56. The base drive to the transistor 68 continues to be applied through the diode 64 and the resistor 66, and the indicator lamp 32 is illuminated if the ignition switch 34 is closed.

Thus, with this unique latching arrangement, a failure warning will be remembered until the failure is remedied. Even though the lamps are turned off and the ignition switch is opened the non-inverting buffer continues operation at a very low current drain to maintain its previous state. As soon as the ignition switch 34 is closed, the warning indication will appear whether or not the lamp switch is closed to actuate the lamp circuit. Thus, when lamp failure occurs with the lamps turned on and the vehicle operating of course with the ignition switch 34 closed, the warning lamp will be illuminated to warn the operator that a lamp replacement or other correction should be made. If the problem is remedied and the lamps remain on or are then turned on, the lamp failure detector 24 will sense the circuit balance and reset the latch to its normal state, thus turning off the warning signal. If, on the other hand, the problem is not remedied during that usage of the vehicle, the latch circuit will remain in the failure state and the warning signal will be given when the vehicle is used again and the ignition switch 34 is closed.

It will thus be seen that the circuit according to the invention utilizing a long term latching element greatly improves the function and usefulness of previously known lamp failure detection circuits by providing a service reminder continuously during vehicle operation until the failure is corrected.

The embodiments of the invention in which an exclusive property or privilege is claimed are defined as follows:

1. A vehicle lamp monitor for providing a warning signal when lamp failure occurs and for continuing the warning signal whenever the vehicle is operated until a correction is made, wherein the vehicle has a vehicle power supply, an ignition switch means, and a lamp circuit including lamp switch means for operatively connecting the lamp to the power supply, the monitor comprising
 a lamp failure detector coupled to the lamp circuit for detecting a lamp failure during operation of the lamp circuit,
 a latch circuit connected to the power supply independently of said switch means and coupled to the lamp failure detector for assuming a failure state when a lamp failure is detected and thereafter maintaining such failure state while the failure condition persists independently of the state of the switch means,
 a warning circuit coupled to the latch circuit and connected through the ignition switch means to the power supply for providing a warning signal when the ignition switch is closed and the latch circuit is in the failure state.

2. A vehicle lamp monitor for providing a warning signal when lamp failure occurs and for continuing the warning signal whenever the vehicle is operated until a correction is made, wherein the vehicle has a vehicle power supply, an ignition switch means, and a lamp circuit including lamp switch means for operatively connecting the lamp to the power supply, the monitor comprising
 a comparator coupled to the lamp circuit for detecting a lamp failure during operation of the lamp circuit,
 an inverting circuit coupled to the output of the comparator for inverting the output,
 a latch circuit comprising a non-inverting amplifier connected to the power supply independently of said switch means and having its input connected to the inverting circuit output and through a resistor to the amplifier output so that the latch circuit is driven to a given state by positive action of the comparator and maintains that state when the comparator is disabled, and
 a warning circuit coupled to the latch circuit and connected through the ignition switch means to the power supply for providing a warning signal when the ignition switch is closed and the latch circuit is in the failure state.

* * * * *